(12) United States Patent
van der Linden

(10) Patent No.: US 8,655,606 B2
(45) Date of Patent: Feb. 18, 2014

(54) METHOD AND SYSTEM FOR DETERMINING STATIC AND/OR DYNAMIC, LOADS USING INVERSE DYNAMIC CALIBRATION

(75) Inventor: Petrus Johannes Gerardes van der Linden, Diest (BE)

(73) Assignee: LMS International NV, Leuven (BE)

( * ) Notice: Subject to any disclaimer, the term of this patent is extended or adjusted under 35 U.S.C. 154(b) by 385 days.

(21) Appl. No.: 13/118,792

(22) Filed: May 31, 2011

(65) Prior Publication Data

US 2012/0048026 A1    Mar. 1, 2012

(30) Foreign Application Priority Data

May 31, 2010    (EP) .................................... 10164523

(51) Int. Cl.
*G01F 17/00*    (2006.01)
*G01F 23/00*    (2006.01)
*G01L 7/00*    (2006.01)

(52) U.S. Cl.
USPC .............................................. 702/56; 702/42

(58) Field of Classification Search
USPC ............................................ 702/42, 56, 109
See application file for complete search history.

(56) References Cited

U.S. PATENT DOCUMENTS

| | | | |
|---|---|---|---|
| 5,477,453 A | 12/1995 | Harashima | |
| 5,610,330 A | 3/1997 | Fricke et al. | |
| 6,363,789 B1 | 4/2002 | Rassaian et al. | |
| 6,985,836 B2 * | 1/2006 | Cremers et al. | 703/2 |
| 7,082,371 B2 * | 7/2006 | Griffin et al. | 702/56 |
| 7,383,136 B1 * | 6/2008 | Griffin et al. | 702/56 |
| 8,175,821 B2 * | 5/2012 | Nagakubo et al. | 702/42 |
| 8,442,780 B2 * | 5/2013 | Lu et al. | 702/42 |
| 2002/0198669 A1 | 12/2002 | Lusted et al. | |
| 2004/0098215 A1 * | 5/2004 | Gee et al. | 702/109 |
| 2005/0278127 A1 * | 12/2005 | Griffin et al. | 702/56 |
| 2007/0083338 A1 * | 4/2007 | Griffin et al. | 702/56 |
| 2009/0306909 A1 | 12/2009 | Mattes | |
| 2010/0049451 A1 * | 2/2010 | Lu et al. | 702/42 |
| 2012/0065983 A1 * | 3/2012 | Ekstrand et al. | 704/500 |

FOREIGN PATENT DOCUMENTS

| | | |
|---|---|---|
| DE | 102005053325 A1 | 5/2007 |
| DE | 102008023094 A1 | 11/2008 |
| EP | 0477948 A2 | 4/1992 |

OTHER PUBLICATIONS

Examination Report of EPO regarding European Patent Application No. 11168256.3, Oct. 7, 2011.
Examination Report of EPO regarding European Patent Application No. 10164523.2, Nov. 4, 2010.

* cited by examiner

*Primary Examiner* — Lisa Caputo
*Assistant Examiner* — Jonathan Dunlap

(57) ABSTRACT

Methods and systems are described for the identification and determination of loads by inverse analysis. A new combination of instrumentation and measurements is provided which allows accurate identification/measurement of static and/or dynamic forces, or loads, working on arbitrary test-objects or systems (i.e. test objects), through measurements of the results of the loads on the test object, signals like pressures, electrical potential, magnet flux displacement, strain, etc. This procedure allows the measurement/identification of arbitrary single or multiple loads, in arbitrary combinations, and multiple directions. The procedure also allows the measurement/identification of loads with arbitrary evolution in time, including static and dynamic loads.

20 Claims, 10 Drawing Sheets

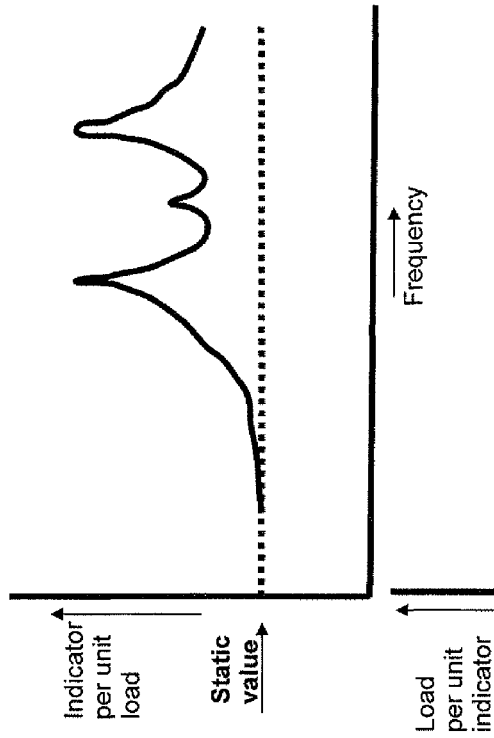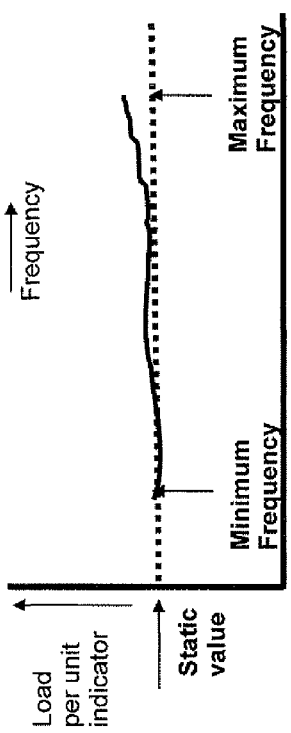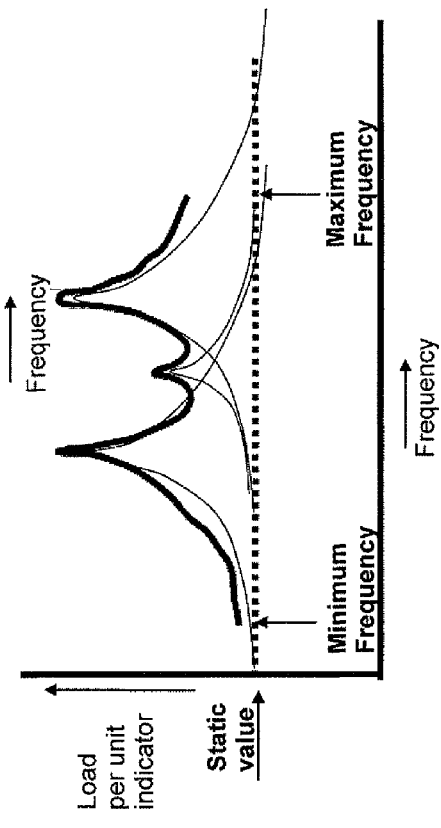

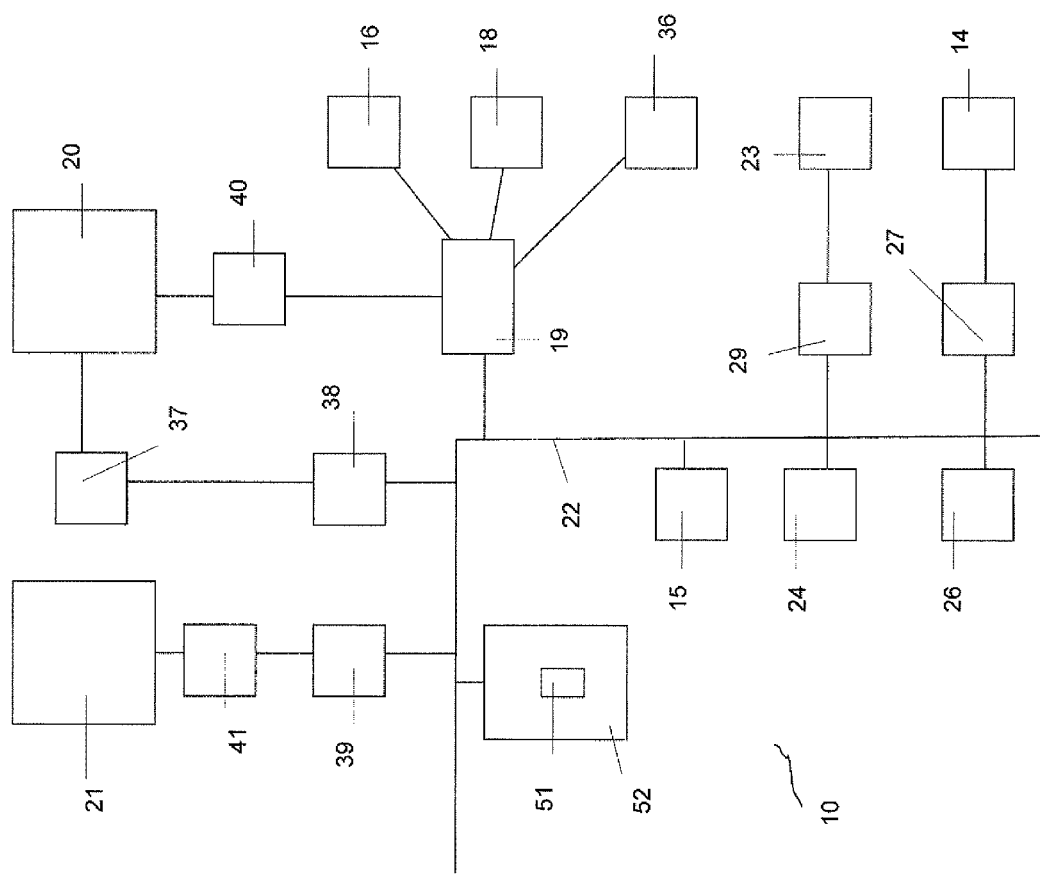

METHOD AND SYSTEM FOR DETERMINING STATIC AND/OR DYNAMIC, LOADS USING INVERSE DYNAMIC CALIBRATION

The present invention relates methods and systems for the identification and determination of loads by inverse analysis.

TECHNICAL BACKGROUND

Load identification constitutes an important type of engineering problem. When dealing with the mechanics of deformable objects such as vehicles, machinery, ships, aircraft, installations etc. the knowledge of the actual loads is essential for design and for diagnosis of potential problems. The mechanical load acting on a complex body cannot be measured directly without introducing measuring devices into the test-object into the load-path. The introduction of such devices can change the properties of the test-object, and of the loads working on or within the test-object, and can even be a source of weakness thus rendering such modified test-object unsafe.

In order to overcome this difficulty, inverse analysis in the frequency domain, which estimates dynamic oscillating loads from measured effects resulting from the loads have been studied extensively during the last two decades. Inverse analysis in the frequency domain uses the transfer function matrix between potential loads and the result of these loads; the indicator signals. The transfer function matrix is inverted and multiplied with the spectra of the measured indicator signals. For dynamic loads, an elastic test-object will exhibit characteristic modes or "eigenmodes". These eigenmodes will have characteristic frequencies. Hence, the response of the test-object will differ depending upon the frequency and the location and direction of the applied loads. This allows the identification of combinations of multiple loads (in direction and in location on the test-object) to be identified.

In practice it is not possible to measure a transfer-function (or transfer-function matrix) from static or 0 Hz upwards. Excitation and sensing needed for transfer-function measurements normally have limitations at lower frequencies, they become excessively expensive and/or in-accurate. Inverse force identification based on transfer functions is therefore limited to highly variable, dynamic and oscillating loads, whose static component is not of interest.

Another well known technique to determine loads is the mount deformation method, where the deformation of flexible element in or on the test-object is measured. The same flexible element can be removed from the test-object, placed on test-bench, and the stiffness matrix can be measured. The combined stiffness and operational deformation will yield the loads in operation; in the frequency domain, or in the time domain including the static load.

Unfortunately there are not always flexible elements at the interface where the loads must be determined, or there are flexible elements but they do not deform enough for a measureable signal, or the deforming part of the test-object cannot be separated from the test-object. So the mount deformation method to determine the static and/or dynamic loads is limited to some special situations.

Another known approach is the inverse strain impulse response method, in which strains are measured on the test-object in operation. Then in a separate test, or analysis, the unaltered test-object in unaltered boundary conditions, is subjected to known or measureable static and possibly also dynamic loads. The strains resulting from these artificial loads are measured as impulse responses. The inverse or reciprocal of these impulse responses is calculated.

The convolution of the impulse responses with the operational strains will yield the loads including the static part of the load.

But the natural boundary conditions will cause reaction forces on the test-object when subjected to the artificial loads. (Objects adrift in space excluded) And these boundary reaction loads can cause the matrix of impulse responses to become singular for the static part (and possibly also at lower frequencies) when multiple loads in natural operating conditions are partially working in the same direction.

In other words, this method will only work when only a few external loads in different directions need to be identified. And, the identification cannot separate the loads and reaction loads from the environment. Multiple loads at multiple locations which are not orthogonal cannot be separated.

The above three methods sometimes also make use of a model of the test-object (analytical or numerical model) instead of measurements to determine the relation between the loads and the indicator signals. This is mostly applicable to test-objects with geometry and materials that can be modelled in a predictable and reliable way. For test-objects that cannot be modelled reliably, an optimization based approach is possible where the model and the loads are updated until a best fit between calculated signals and measured signals is obtained.

Today, in practice, for complex test-objects with multiple loads working on, or within, the test-object in operational conditions, the described state of the art techniques are unsatisfactory for the identification of loads which have an essential static or very low frequency part. The invention provides a solution which allows identification of multiple loads at multiple interfaces, even when these loads are largely or entirely along the same direction. The time signals of these multiple loads, or the spectra can be identified, including the very low frequency or static part.

SUMMARY OF THE INVENTION

The present invention provides a method and system for determining loads on a test object.

The method can comprise the steps of:

1. During a first time interval, when the test-object is in natural operating condition, indicator signals are measured on the test object.

2. The test-object is taken away from its natural environment. All or the part of the test-object, which is outside the interfaces where the loads are to be identified, is removed. The remaining test-object is placed on supports, preferably very compliant supports, to stabilize its position.

3. During a second time interval in which the test-object is in calibration condition, the test-object is subjected to artificial dynamic loads for each possible external or interface load individually and the indicator signals in response to the artificial loads are measured. Alternatively, combined artificial loads can also be used, as long as the load-indicator relations are still quantified as frequency domain transfer functions. Excitation devices are used which do not exert static loads, but dynamic or oscillating loads. The excitation therefore does not cover the lowest frequencies or static part of the natural loads which are to be identified.

4. The effect of modes of the test-object on its suspension, supports, or other constraints can be identified using modal analysis. These modes are subtracted from the load-to-indicator transfer functions. The remaining transfer functions cover the behavior of the test-object when freed from its constraints.

5. If the load-indicator transfer functions show test-object internal modal behavior, then it is preferred to use the identified test-object modes to re-synthesize the load-indicator transfer functions from static upwards in frequency, covering the frequency range of the operational loads.

6. After the previous operations, the transfer functions will approximate be constant (frequency independent) at the lowest frequencies. The transfer functions can then be completed downwards in frequency and even to static to cover the operational frequency range, using the constant value.

7. The transfer function matrix between the loads and the indicators is inverted, and if desired the indicator to load transfer functions are transformed to impulse responses.

8. The loads are then obtained by multiplication of the transfer functions with the spectra of the indicator signals, or by convolution of the time signals from the indicators with the impulse responses.

The methods of the present invention include multiple loads and/or loads in multiple directions applied to an object. The calibration (second time interval) is dynamic. The method also involves load identification. Load identification is different from loads measured directly. The type loading and the boundary conditions are changed from operational situation (first time interval) to the test-bed situation (second time interval). The change in boundary conditions is from constrained to free-free. The suspension in the test-bed situation provides a softly suspended condition, which can be realized by soft metal or rubber springs or magnetic suspensions or electrostatic fields, etc. The loads are identified and there is an extrapolation of frequency from the second time interval to the first time interval.

This process yields identified loads over a frequency range which exceeds the frequency range of the calibration measurements between the loads and the indicators in the second time interval. This procedure can therefore also yield static load information, by the much more feasible dynamic calibration in the second time interval. And the identification of loads with an essential static part can now also cover multiple loads at multiple interfaces. And using the dynamic calibration, multiple loads in the same direction can be separated, which would not be possible using static calibration because of the reaction loads during a static calibration.

Accordingly, the present invention provides a method of determining loads on a system, the system comprising a test-object or structure operating in a first mode of operation, the method comprising:

measuring indicators representing results of first loads exerted on at least one element of the test-object or structure during a first time interval when the system or structure is operating in the first mode of operation, and deriving by measurement a relation between the first loads and the indicators valid for the first mode of operation in a controlled way during a second time interval, wherein during the second time interval the test-object or structure is operated in a second mode of operation in which the test object or structure is conditioned to allow measurement of responses to applied second loads, the environment of the test-object or structure and/or the way the test-object or structure is supported, is/are changed compared to the first mode of operation, the relation being determined by applying second loads as dynamic excitations and measuring responses thereto at frequencies which are higher, or partially higher, then the frequencies of the first loads applied in the first mode of operation, extrapolating, or completing down in frequency the relation, optionally down to static to provide the relation over the frequency range relevant for the first mode of operation, the extrapolation being made either by assuming a frequency independent relation below the measured frequency range or based on the modal properties of the test-object or structure, and being applied in an inverse analysis in order to calculate the first loads at other frequencies in the time domain or in the frequency domain.

During, the second time interval, the measurement can be done on a partially disassembled test-object or structure, when loads at certain interfaces within the test-object or structure are to be identified.

During the second time interval, the changed environment can be that the measurement is done with the test-object in modified boundary conditions.

For example, during the second time interval, the measurement can be done with the test-object or structure in a softly suspended condition, whereby the test-object or structure is suspended on supports such that the test-object or structure is free of constraints above a certain frequency.

In an embodiment of the present invention the extrapolation includes a determination from measurements of a relation matrix between first loads and indicators for the inverse analysis.

In the method what are called "indicators" are results of application of the loads and can be strains for example.

In a preferred application of the present invention the test-object or structure to be tested is a vehicle such as a land vehicle such as an automobile, bus or truck, a flying object such as an aircraft or a water craft such as a boat or ship.

The second loads, as used during the second time interval, can be spatially transformed to other locations and directions location on the test-object or structure.

The measured relation between the excitations and the responses thereto carried out during the second time interval are preferably modified to eliminate the effect of the supports, suspension, or any other boundary condition determined modes to be able to extrapolate down to lower frequencies and/or static.

The measured relation between the excitations and the responses thereto carried out during the second time interval, can be synthesized using identified modes and upper and lower residual terms, optionally in combination with integration or differentiation in the frequency domain, to extrapolate down to lower frequencies and/or static.

The present invention also provides a system for the determination of loads on system, the system including at least a test-object or structure, first loads being exerted on at least one element of the test-object or structure during a first time interval, the system comprising:

first means for measuring indicators being the results of application of the first loads exerted on at least one element of the test-object or structure during the first time interval of operating in a first mode of operation, means for exerting second loads in a controlled way on at least one element of the test-object or structure during a second time interval of operating in a second mode of operation, second means for measuring responses to the application of the second loads, means for deriving the relation between the first loads and the indicators, the means for deriving using outputs of the second means for measuring, whereby during the second time interval the test-object or structure is conditioned to allow measurement of the responses, the environment of the test-object and/or the way to support the test-object being changed compared to the first mode of operation, the second means for measuring being adapted to measure the responses at frequencies which are higher, or partially higher, then the frequencies of the loads in the first mode of operation, the means for deriving being adapted to extrapolate the responses, or complete down in frequency, optionally down to static to thereby cover the frequency range of the first mode of operation and to extrapolate either by assuming a frequency independent relation below the measured frequency range or based on modal properties of the test-object or structure, and being adapted to apply an inverse analysis to calculate the first loads in the time domain or in the frequency domain. The system is preferably a computer based system.

The system of the present invention is adapted for multiple loads and/or loads in multiple directions applied to an object. The calibration (second time interval) is dynamic. The system is also adapted for load identification. Load identification is different from loads measured directly. The type loading and the boundary conditions are changed from operational situation (first time interval) to the test-bed situation (second time interval). The change in boundary conditions is from constrained to free-free. The suspension in the test-bed situation provides a softly suspended condition, which can be realized by soft metal or rubber springs or magnetic suspensions or electrostatic fields, etc. The loads are identified and there is an extrapolation of frequency from the second time interval to the first time interval.

The first or second means for measuring can comprise strain gauges.

Preferably the means for deriving is adapted to determine from measurements a relation matrix for the inverse analysis.

The load-indicator relationships are meausred in the frequency domain. This is also deviating from the normal procedure because measuring the almost static relation in the frequency domain requires extremely long measurement times and no oscillating loads such as sinusoidal or random loads are used in the frequency domain as is done in the present invention.

One aspect of the present invention is to remove parts of the object under test before commencing with the second calibration phase, e.g. on a road vehicle the tires would be removed, or other clamping, and replace this with a very compliant suspension. This is not the normal way because it makeq static calibration loads impossible. But, this is perfectly possible with dynamic calibration at suitable higher frequencies. This is also not the normal way because indicator signals will respond in a different way to the loads because the environment boundary conditions are changed.

Any effect of rigid body modes (e.g. resonances of the vehicle on the soft suspension of the calibration phase) is eliminated from the load indicator relationships by using a modal model and mode elimination. This is not the normal way because normally the natural boundary conditions are used. In the calibration phase a very compliant suspension is used. This is not the normal way because statically this will constrain the object under test, and it will add rigid body modes. But, this is perfectly possible with dynamic calibration at suitable higher frequencies. This is also not the normal way because indicator signals will respond in a different way to the loads because the environment boundary conditions are changed.

The effect of the rigid body modes (e.g. resonances of the object under test such as the fuselage or whole aircraft on the suspension) are eliminated from the load indicator relationships by using a modal model and mode elimination. This is not the normal way because normally the natural boundary conditions are used.

With respect to dynamic load identification used dynamic loads, methods and systems of the present invention do not use the same frequency range in the first and second modes, but use higher frequencies. This is not the normal way a skilled person would operate because of risk of exciting higher frequency eigenmodes of the test structure that will perturb the desired relationship.

The suspension used in the calibration phase may add rigid body modes in the frequency range of identification, but this will allow a modal analysis. This is not the normal way because the load-indicator relationships are strongly influenced by the rigid body modes. The effect of the higher frequency modes is eliminated from the load indicator relationships by using a modal model and mode elimination to be able to construct the part below the measured frequency range. Normally a skilled person would retain the modes in the measured frequency range because they provide the essential information in the frequency of analysis. Methods of the present invention recombine the extrapolated frequency range with the measured frequency range.

Artificial loads are applied in a controlled way by devices that have an internal measurement of the applied load. This calibration measurement is done on by one, or for several in parallel, for all potential loads.

Figure 3A:
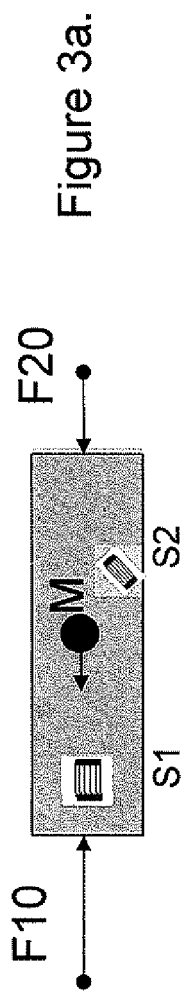
Figure 3B:
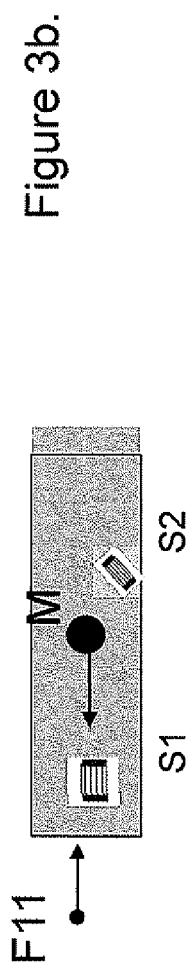

FIG. 3*a*. Simple object in operating condition. Under influence of the natural loads F10 and F20 the object is moving in space. FIG. 3*b*. Simple object during unbalanced static calibration condition. Under influence of actuator force F11 the object is moving in space.

Figure 3C:
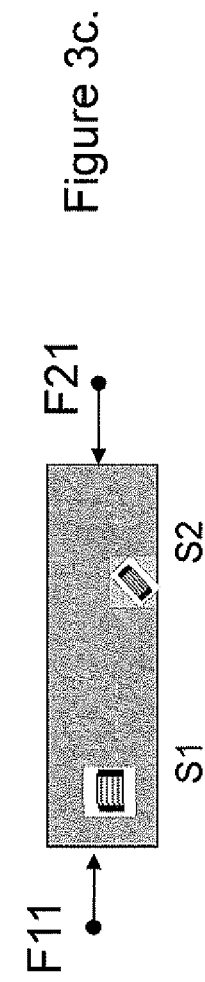

FIG. 3*c*. Simple object in balanced static calibration condition, with actuator force F11 being compensated by reaction force F21. The object does not move.

Figure 4A:
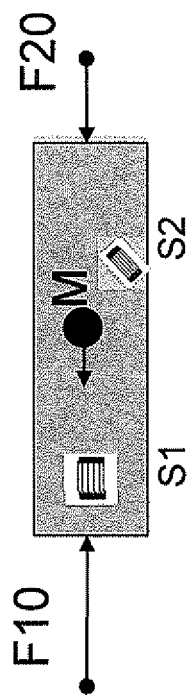
Figure 4B:
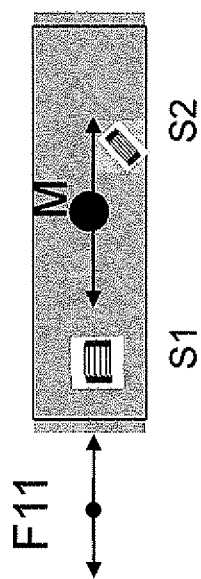
Figure 4C:
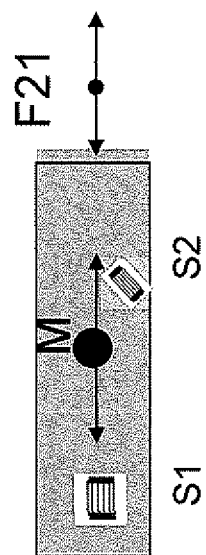

FIG. 4*a*. Simple object in operating condition. Under influence of the natural loads F10 and F20 the object is moving in space. FIG. 4*b*. Simple object in dynamic calibration condition. The object is oscillating around a fixed position in space, under the influence of the dynamic actuator force F11. FIG. 4*c*. Simple object in dynamic calibration condition. The object is oscillating around a fixed position in space, under the influence of the dynamic actuator force F21.

FIG. 5*a*. Example of the amplitude graph of a typical measured force to strain transfer in the frequency domain. FIG. 5*b*. Example of the amplitude graph of a measured load to indicator transfer in the frequency domain, where the measurement frequency range is well above the rigid body modes on the test-object on its suspensions, and well below the lowest deformation mode. FIG. 5*c*. Example of the amplitude graph of a measured force to strain transfer in the frequency domain, where the measurement frequency range covers several modes. The effect of the individual modes is also indicated.

Figure 6:
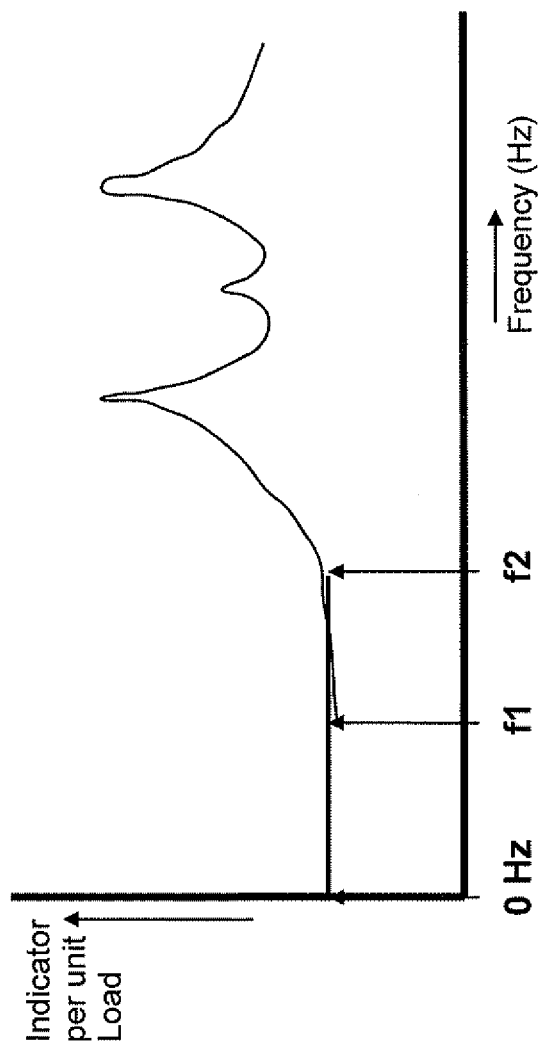

FIG. 6. Schematic example of the extension of a load to indicator transfer function to 0 Hz, using the average transfer function in the frequency range between f1 and f2.

Figure 7:
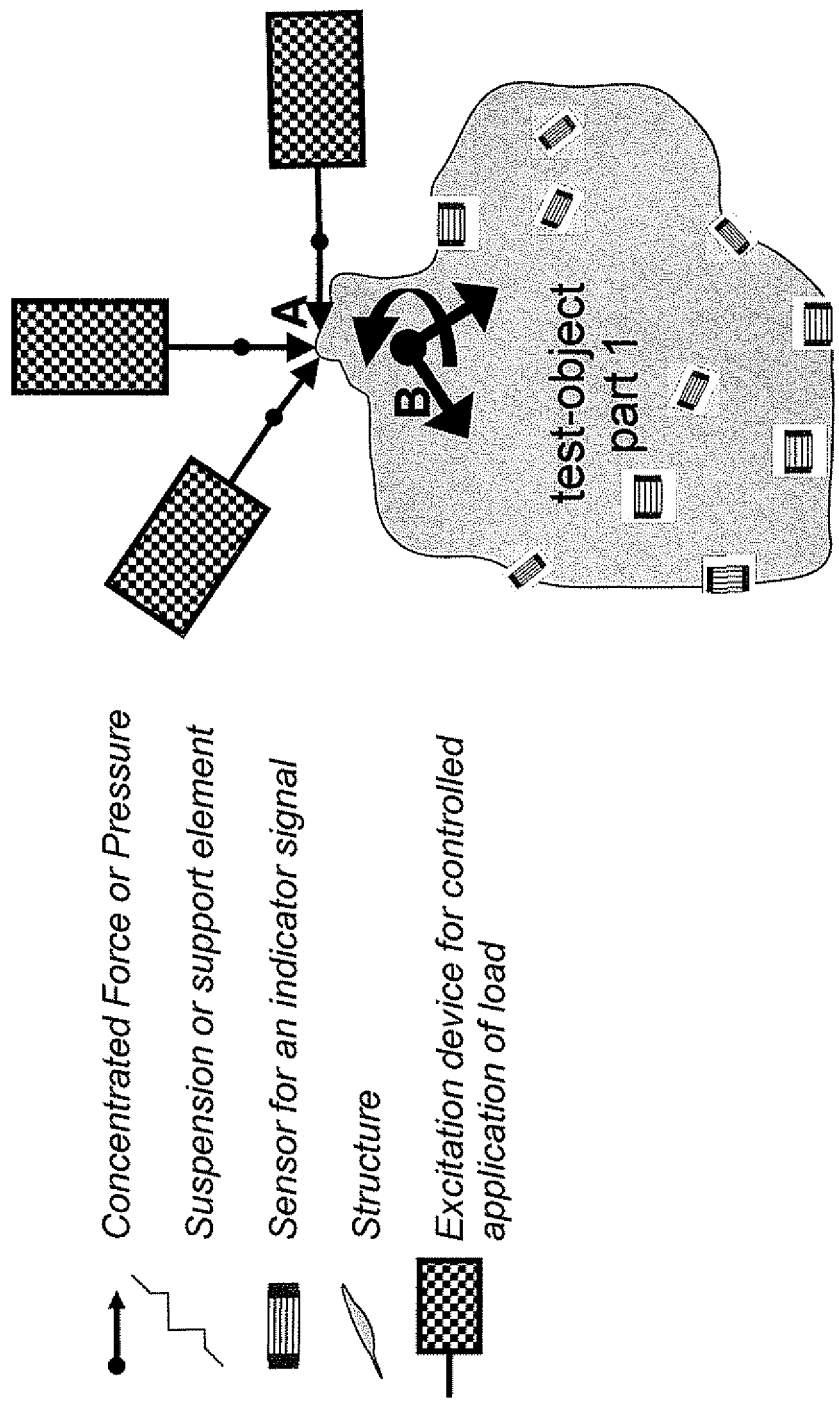

FIG. 7. Schematic representation of a test-object part 1, during the second time interval, in calibration condition. The excitation devices apply loads in various directions at location A. The loads are transformed spatially to an equivalent set of loads in other directions and/or working at another location B.

Figure 8:
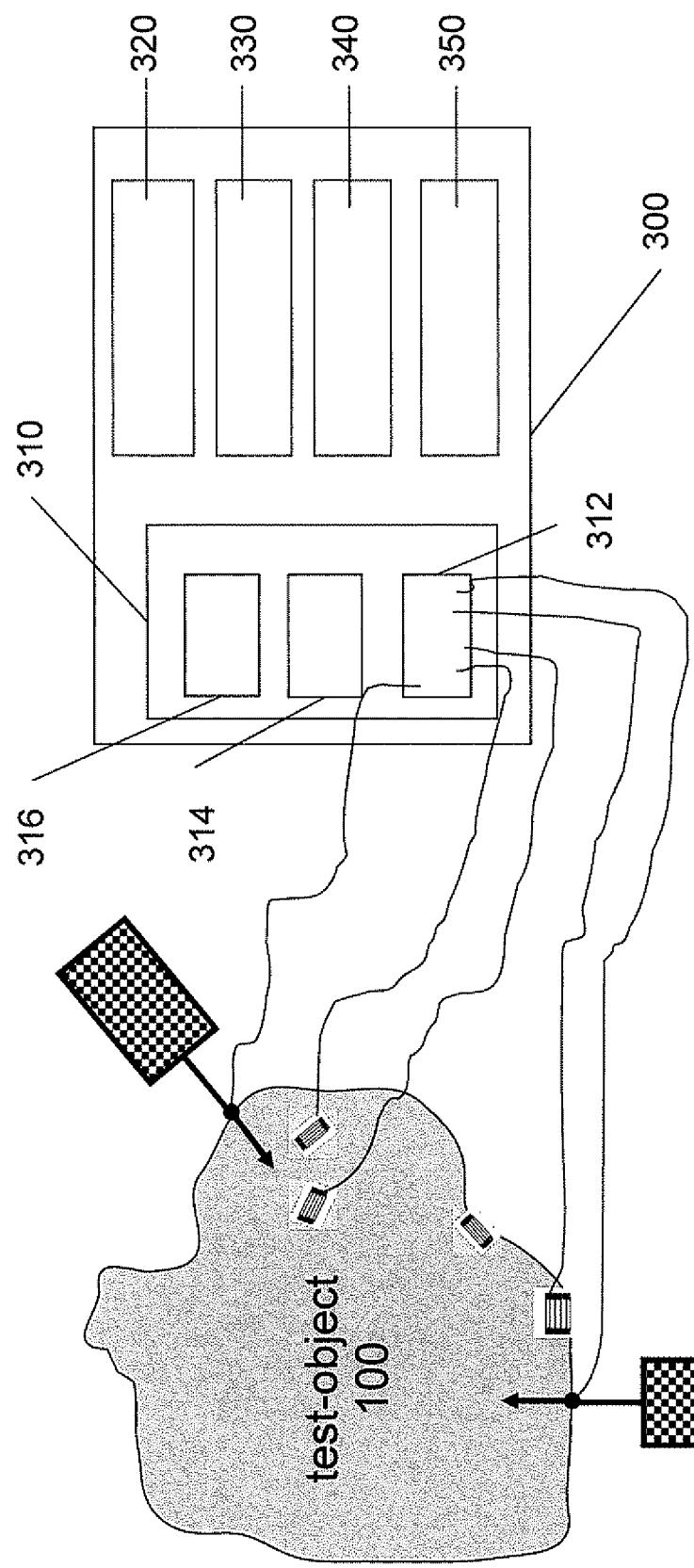

FIG. 8 is a schematic representation of a computer-based system according to an embodiment of the present invention.

Figure 9:
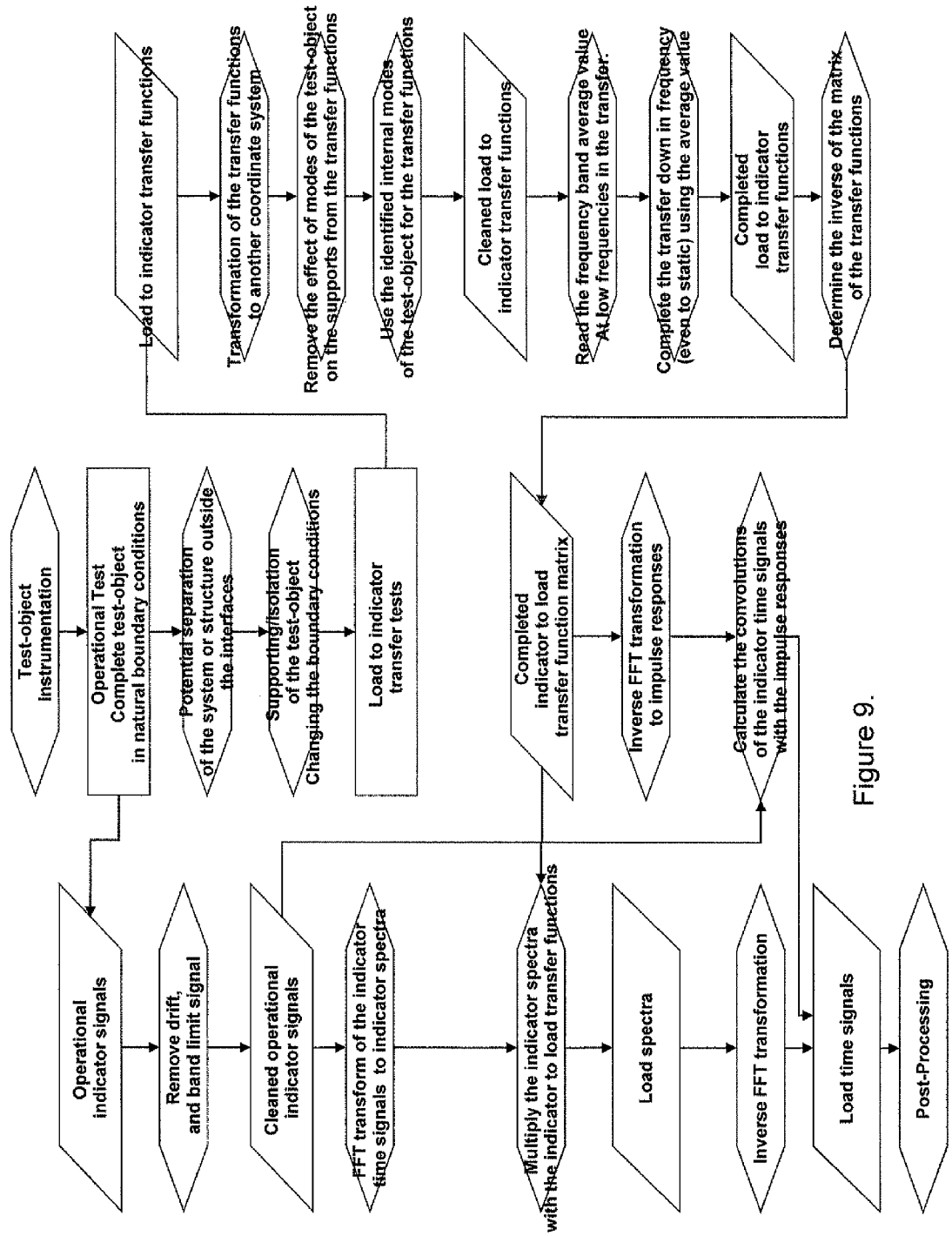

FIG. 9. Flow diagram of the entire process of load identification.

FIG. 10. Schematic representation of a computing system which can be utilized with the methods and in a system according to the present invention.

DEFINITIONS

"Load" should be interpreted broadly and can be any suitable load exerted on the system such as external force, internal interface force, internal or external pressure, etc.

"Test-object" should be interpreted broadly and can include structure, assembly, component, assembly, system, vehicle, machine, etc. building, etc, which is subject to loads and is an object of the load identification.

"Indicator" refers to a measured signal resulting from the application of one or more loads. An indicator can be, for example, a relative displacement, a pressure, a flux, a strain or any other signal that indicates the result of application of a load.

"Excitation" refers to controlled artificial application of a load by a device with allows accurate measurement of the load direction and time signal.

"Boundary condition" refers to conditions that provide contact of the test-object with other objects, or supports, or the environment. It is possible that the boundary conditions constrain the test-object.

"First time interval" is the time interval in which the test-object is for example operating in a natural way or the way that the object is intended to be operated. For a road vehicle this includes driving the vehicle under normal driving conditions that can include on or off-road diving. For other vehicles like aircraft or ships this would be flying or sailing, respectively. During the first time interval the test-object is operated in a first operating mode which is the situation in which the first loads are to be identified. In this condition the test-object is complete and in its natural boundary conditions.

"Second time interval" is the time interval in which the test-object or a part of the test-object is subject to second loads, especially dynamic loads and responses to these loads are measured. A relation matrix between the loads and the indicators is measured. Hence in this time interval the test-object is in a second operating mode or calibration condition. In this mode the test-object is completely or partially disconnected from its natural boundary conditions.

DETAILED DESCRIPTION OF THE ILLUSTRATIVE EMBODIMENTS

The present invention relates methods and systems for the identification and determination of loads by inverse analysis. The present invention provides a new combination of instrumentation and measurements which allows accurate identification/measurement of static and/or dynamic loads, working on arbitrary structures or systems (i.e. test-objects), during their natural working conditions through measurements of the results of the loads on the test object, e.g. signals like pressures, acceleration, stress, electrical potential, magnet flux, strain, etc. For example, the measurement of indicators which are the results of application of loads allows a large freedom in the location and direction of the sensors used. This procedure allows the measurement/identification of arbitrary single or multiple loads, in arbitrary combinations, and multiple directions. The procedure also allows the measurement/identification of loads with arbitrary evolution in time, including static and dynamic loads.

In a first aspect a method of determining low frequency or static loads on a system is described, the system comprising a test-object or structure operating in a first mode of operation, the method comprising:

measuring indicators representing results of first loads exerted on at least one element of the test-object or structure during a first time interval when the system or structure is operating in the first mode of operation, and deriving by measurement a relation between the first loads and the indicators valid for the first mode of operation in a controlled way during a second time interval, wherein during the second time interval the test-object or structure is operated in a second mode of operation in which the test object or structure is conditioned to allow measurement of responses to applied known, or measureable, second loads, the environment of the test-object or structure and/or the way the test-object or structure is supported, is/are changed compared to the first mode of operation, the relation being determined by applying second loads as dynamic excitations and measuring responses thereto at frequencies which are higher then the frequencies of the first loads applied in the first mode of operation, extrapolating, or completing down in frequency the relation to cover the frequency range relevant for the first mode of operation, the extrapolation being made either by assuming a frequency independent relation below the measured frequency range or based on a modal model of the test-object or structure, and being applied in an inverse analysis in order to calculate the first loads at other frequencies in the time domain or in the frequency domain. A part of the frequency range can be overlapping in frequency of the first and the second time intervals. During, the second time interval, the measurement can be done on a partially disassembled test-object or structure, when loads at certain interfaces within the test-object or structure are to be identified, and/or during, the second time interval, the measurement is done on the test-object or structure, or remaining part of, in boundary conditions which provide negligible constraining dynamic forces from the environment, or supports, in the frequency range used in the second time interval, this boundary condition limiting a range of static displacement.

The dynamic constraining forces from the environment can be not negligible, causing additional suspension modes in the frequency range of the second time interval, and wherein a modal model is used to extract the unconstrained behavior from the measured relations between the loads and the indicator signals.

The extrapolation can include a determination from measurements of a relation matrix between first loads and indicators for the inverse analysis.

In particular embodiments the indicators being results of the loads are strains.

In other embodiments the test-object or structure to be tested is a vehicle.

The second loads, as used during the second time interval, need not be in the same direction, or same location, as the loads in the first time interval, and geometrical transformation is used to derive the required relations for the identification of the loads in the first time interval. The measured relation between the loads and indicators thereto carried out during the second time interval, can be synthesized using identified modes and upper and lower residual terms, optionally in combination with integration or differentiation in the frequency domain.

An advantage of the present invention is that its methods can be combined with known matrix inversion methods for dynamic force identification, both in the time domain as well as in the frequency domain. A further advantage is that the determination of the relationship between the results of the loads on the test object and the loads to be determined, e.g. between the indicator signals and the forces to be identified/measured, does not require the environment or boundary conditions of the operating condition during the first time interval, neither does it require static calibration or calibration in the frequency range or in the complete frequency range of the operating condition of the first time interval, nor does it require a finite element model of the test-object. A dynamic calibration process in the frequency domain can provide the relations between the potential loads and the indicator signals. A further advantage is that arbitrary dynamic signals can be used, and that excitation devices for dynamic excitation can be used for the calibration. The determination of the relationships between results of the application of loads and the loads themselves, e.g. between strain measurements and forces, is preferably, but not necessarily, done on the test-object or system in softly suspended condition. This suspended calibration condition means that from a certain frequency upwards the support loadings working on the test-object or system are small compared to the excitation load and their resulting inertial forces or modal forces in the test-object. The determination of the relationships between results of the application of loads (indicator signals) and the loads themselves, e.g. between strain measurements and forces, can be combined with a modal analysis, in which the effect of modes in the frequency range of the calibration measurement are subtracted from the measured relations followed by an extrapolation of the measured relations down in frequency, or even down to static. This procedure can be combined with matrix inversion techniques like over-determination, regularisation etc.

The present invention also includes a system, a computer based system, for the determination of low frequency or static loads on system, the system including at least a test-object or structure, first loads being exerted on at least one element of the test-object or structure during a first time interval, the system comprising:

first means for measuring indicators being the results of application of the first loads exerted on at least one element of the test-object or structure during the first time interval of operating in a first mode of operation, means for exerting second loads in a controlled way on at least one element of the test-object or structure during a second time interval of operating in a second mode of operation, second means for measuring responses to the application of the second loads, means for deriving the relation between the first loads and the indicators, the means for deriving using outputs of the second means for measuring, whereby during the second time interval the test-object or structure is conditioned to allow measurement of the responses, the environment of the test-object and/or the way to support the test-object being changed compared to the first mode of operation to allow measurement of responses to applied known, or measureable, second loads, the second means for measuring being adapted to measure the responses at frequencies which are higher then the frequencies of the loads in the first mode of operation, the means for deriving being adapted to extrapolate the responses, or complete down in frequency, optionally down to static to thereby cover the frequency range of the first mode of operation and to extrapolate either by assuming a frequency independent relation below the measured frequency range or based on a modal model of the test-object or structure, and being adapted to apply an inverse analysis to calculate the first loads in the time domain or in the frequency domain. A part of the frequency range can be overlapping in frequency of the first and the second time intervals.

In particular embodiments the first or second means for measuring can comprise strain gauges.

The means for deriving can be adapted to determine from measurements a relation matrix for the inverse analysis.

During the second time interval the test-object or structure can be a partially disassembled test-object or structure, when loads at certain interfaces within the test-object or structure are to be identified, and/or during, the second time interval, the measurement is done on the test-object or structure, or remaining part of, in boundary conditions which provide negligible constraining dynamic forces in the frequency range used in the second time interval, but wherein the boundary condition limits the range of static displacement.

The dynamic constraining forces from the environment can be non-negligible, causing additional suspension modes in the frequency range of the second time interval, and wherein the system is adapted to utilize a modal model to extract the unconstrained behavior from the measured relations between the loads and the indicator signals.

In particular embodiments the test-object to be tested is a vehicle.

The excitation forces during the second time interval need not be in the same direction, or same location, of the loads in the first time interval, and geometrical transformation is used to derive the required relations for the identification of the loads in the first time interval.

The system can be adapted so that a measured relation between the loads and indicators thereto carried out during the second time interval, is synthesized using identified modes and upper and lower residual terms, optionally in combination with integration or differentiation in the frequency domain.

An important aspect of the methods and systems of the present invention lies in the fact that the calibration of the indicator signals, or determination of the relations between the loads and indicator signals is not necessarily performed under the boundary conditions in operation, nor in static condition, but under altered boundary conditions, like suspended condition, and it can be measured in a frequency range above the frequency range of the normal operational condition. The advantage of this is that in a first time interval loads are measured under normal operating conditions without significant limitation. Thus, the "natural behavior" of test object is determined without modifying the structure of the test-object in a way which alters its mechanical behavior. For example strain gauges may be applied to the test-object but the structure is not mechanically affected by such attachment. In order to determine the relationship between the loads and the indicators, the test-object is subject to measurements in a second time interval which can be under better controlled conditions, e.g. laboratory conditions. By the use of dynamic, especially oscillating loads applied during the second time interval, gross bodily movement of the test-object in one or more directions can be prevented. This avoids the need for extensive facilities allowing free movement of the test-object. Hence even very large vehicles can be calibrated in a reasonable space.

Figure 1:
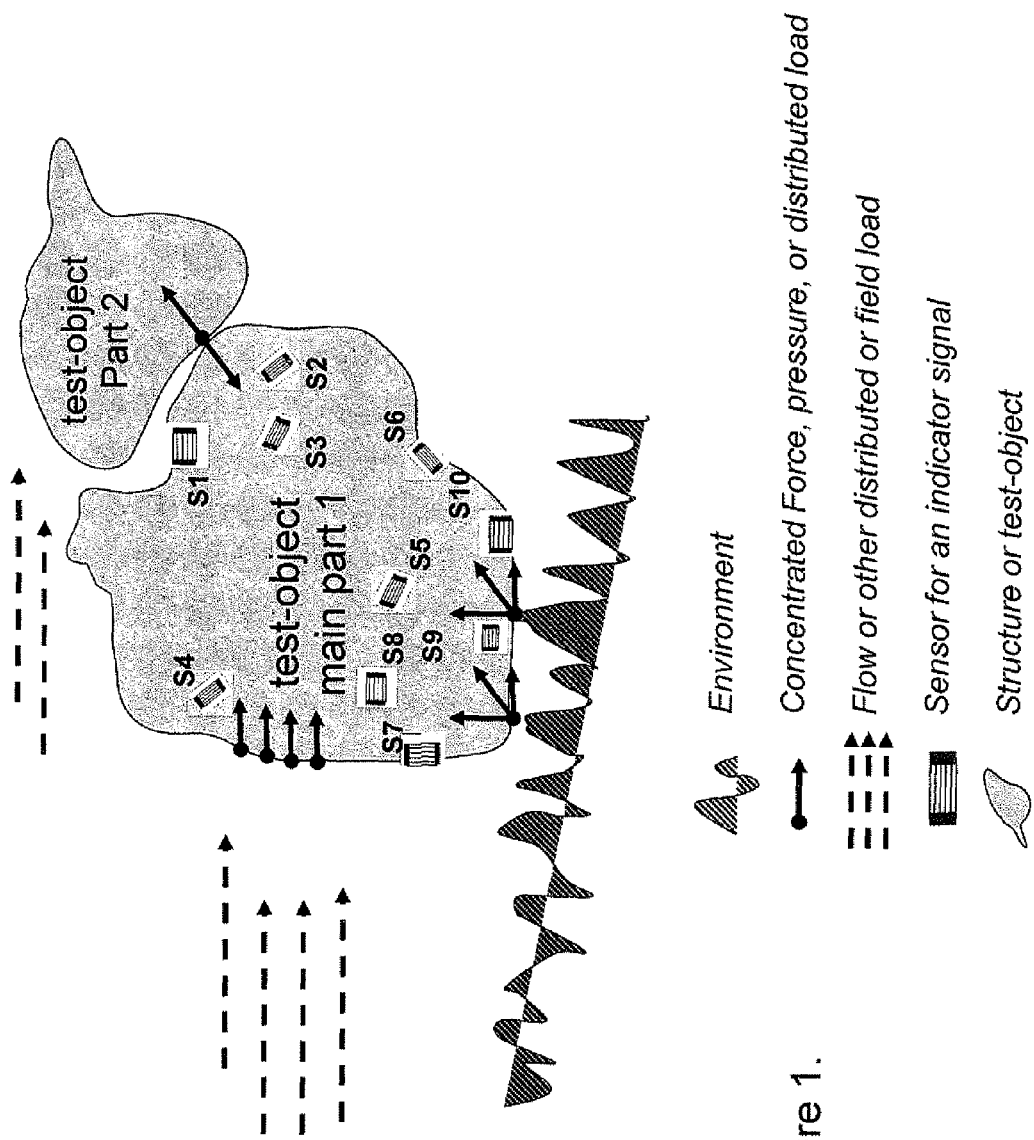
FIG. 1. Example test-object in two parts, during the first interval, in operating condition. The test-object structure is subject to distributed loads and concentrated loads from its environment, e.g. loads like concentrated forces and pressure, etc. from its environment. The environment could be supportive, or in motion, or having distributed effects like flow or magnetic fields etc. These external loads can also cause loads at internal interfaces of the test-object, for example between the main part 1 and part 2.

FIG. 1 is a schematic representation of a complete test-object to be measured in its natural working condition. Various loads from the environment and the loads at the interface of part 1 and part 2 are to be identified. The details of the complete test-object are not shown for clarity reasons. Applied to the test-object part 1 are a plurality of sensors that are able to capture the results of the application of loads. Application of loads can occur because of the way the test-object is operated, e.g. driving around curves, over bumps etc. Hence the term "application of loads" should be construed broadly to mean more than just loads applied by human intervention. Such loads may be wind loads, gravitational loads, centrifugal loads, wave loads, loads exerted by the environment etc.

Figure 2:
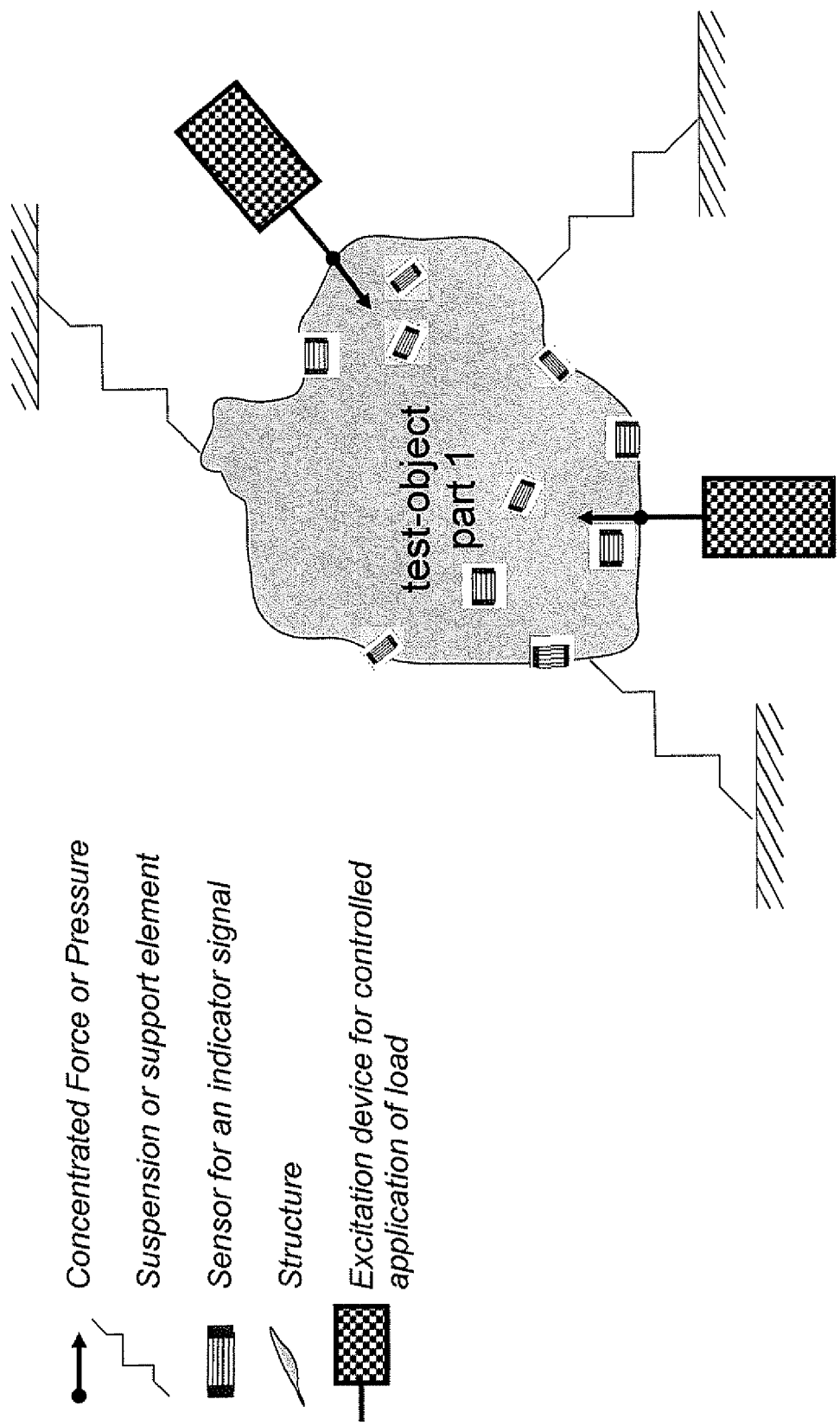
FIG. 2. Test-object part 1, during the second time interval, in calibration condition. The test-object part 1, on which loads are to be identified, is suspended or otherwise constrained to prevent it to move without limits. In this way the boundary conditions for part 1 are different from the first time interval.

FIG. 2 shows the test-object which can be a partial test-object, part 1, in a calibration condition. Preferably, all indicator signals are measured, both in time interval 1 and in time interval 2, on part 1 of the test-object. As an example, the results of application of loads can be strains in the test-object to be tested and the sensors S1 to S10 can be strain gauges. The number of indicator signals can be less or more then ten. The applied loads can be concentrated external loads or internal loads, or distributed loads like pressures or field induced loads like gravity, etc.

In accordance with an embodiment of the present invention there are two distinct measurement steps in a method for determining the loads on a test-object during operational conditions:

Step 1. In the first time interval with natural operational conditions, a complex test object (see FIG. 1) is subject to dynamic and/or static loads, or forces. These can be external or internal forces, distributed loads, field effects, e.g. wind, impact, magnetic, etc.

It is an aim of the present invention to determine the loads. In embodiments of the present invention an indirect approach is taken whereby the results of the loads, the indicator signals are measured on the test-object. Hence the test-object is provided with sensors S1-S10 which provide indicator signals, which are measures of the results of the application of the loads. These are made at selected points on the test-object. Different kinds of signals; pressure, relative position, flux, strain, etc. which capture an effect due to the loads can be used.

The position of the indicator sensors, may be selected by engineering judgment. Alternatively and especially for complex test-objects the position of the sensors may be selected based on a mechanical model of the test-object.

Step 2. In the second time interval, under controlled, e.g. non-operational, conditions loads are applied artificially, using excitation devices, (see FIG. 2) to all or a main part of the same test-object which has been tested to thereby determine via measurement the relationship between the interface forces and the results of the loads, e.g. strains, i.e. to achieve a calibration of the sensors. This procedure then allows an inverse analysis to be performed. In this situation all or the main part of the complex test-object is separated from the environment and other parts at the interface where the forces are to be identified. Then the test-object part is supported in a way which is practical for the calibration. The supports are preferably soft. FIG. 2 indicates the sensors S1-S10. And, dynamic forces are applied to the test-object part 1 by at least one actuator A37. The dynamic forces applied are preferably forces whose time average is zero. The dynamic forces may be oscillations, impulsive, random, etc.

Because of the changed boundary conditions and typically higher frequency range of the excitation loads in the second time interval compared to the first time interval, a correction and extension in the frequency range of load to indicator signal relation-matrix downwards in frequency, or even to static, is required.

If the boundary conditions during the second time interval were such that the eigen-frequencies of the rigid body modes of the test object on its supports were well below the excitation frequency range, then the loads from the supports will be much smaller then the excitation loads, and the effect of the loads at the supports on the indicator signals can be neglected. In that case the artificial excitation loads are balanced by inertia and/or deformation modes within the test-object. The eigen-frequencies of the rigid body modes on the supports are preferably a factor three or alternatively a factor ten lower then the lowest frequency used in the artificial excitation to meet this condition. The shape of the transfer function between loads and indicator signals in these conditions is indicated in FIG. 5a and FIG. 5b.

If the boundary conditions and the frequency range of artificial excitation do not meet the above condition, then the modes of the test-object can be measured, and the effect of the test-object on support modes can be subtracted from the load-indicator signal relations, as indicated in FIG. 5c.

After the elimination of the effect of the supports or other constraints, it may be necessary to identify modes within the test-object, like for example deformation modes. If the frequency range used in the second time interval is much lower then the lowest eigen-frequencies of the test-object internal modes, preferably a factor three or alternatively a factor ten lower in frequency, then this step is not needed. In that case the load to indicator signals is almost independent of the frequency, and can thus be extended downwards, even to static. This is indicated in FIG. 5b.

However, if the test-object internal modes are within the frequency range of the artificial excitation in the second time interval, then the eigen-modes and upper residuals can be used to extend the frequency range of the load-indicator transfer functions downwards in frequency to a frequency range where a constant, frequency independent, transfer is found.

The low frequency part of the transfer function is extended downwards in frequency using the average value of the transfer, as indicated in FIG. 6. In this embodiment, the relation between the loads and the loads is assumed to be time independent.

In this embodiment, the operational loads are preferably calculated by means of inversion of a matrix of the load to indicator signal relations:

$$L=[Hil]^{-1}*I \qquad (1)$$

Where L is the vector of combined loads Li

Where I is the vector of combined indicators Ii

Where Hil is a matrix containing elements of the amount of the result of the load, e.g. the indicator signal per unit of the load.

To determine the relation between all results of loads and all interface forces, in the conditions of the second time interval, there are at least two possibilities, each of which is a separate embodiment of the present invention:

1. Interface loads (forces) are imposed one by one with a known level, and the results of the loads, e.g. the strains, are measured.

2. Or different combinations of interface forces are applied and the results of the combined loads, e.g. strains are measured. The combinations are preferably such that the results of the loads, e.g. the strains due to individual forces can be calculated by means of inverse analysis.

All possible loads, forces, moments, surface pressures and distributed or concentrated internal forces in the volume on- and in- an object, including gravitation, are always in balance. This means the sum of each individual load or alternatively each combination of loads is zero when integrated over time:

Summ(Fx)=0

Summ(Fy)=0

Summ(Fz)=0

Summ(Mx)=0

Summ(My)=0

Summ(Mz)=0 (2)

If one were to apply a single static, load, or an unbalanced combination of loads to this test-object in its supported condition, then the test-object will move in space in reaction to this single load. In laboratory conditions it is often not sufficient space to allow large excursions of the test-object or such excursions are impractical. If, to avoid this problem, multiple loads are applied in a balanced way, then the test-object does not start to move but the equilibrium of the forces will lead to a singular matrix of force-strain relations, which does not allow inversion. Or, in other words, when several loads, possibly overlapping in direction, are to be identified, it is not possible to apply sufficiently different combinations of static loads, such that the individual loads can be calculated.

To illustrate this with a simple case with two external loads F10, F20, the structure is placed under two axial loads at two of its ends (see FIG. 3a) in the operational condition (operational phase). There are external loads F10, F20, in this case concentrated forces, at both ends and there is motion, all only in one degree of freedom. The test-object is in this case instrumented with multiple strain sensors, which provide indicator signals, around the interface locations. The external forces are to be measured and therefore the interface force to strain relations have to be determined. Next, in the quasi free suspension (calibration phase), a single static force F11 is applied at the left end of the unconstrained object (FIG. 3b). Then the object will accelerate balanced by an inertial force. The resulting strains are a combination of the external and the internal inertial force. The movement of the object during testing makes measurement more complex, e.g. it may be necessary to use wireless sensors to be able to track the strains or an unwieldy umbilical cable will have to be applied to the test-object that will affect the effect of applied forces on the test-object.

If a combination of balanced static forces F11, F21 is applied (FIG. 3e), there is no motion but there exists only one combination which is balanced, making inversion of the force/strain matrix impossible.

To solve these problems, in accordance with the present embodiment of the invention, use is made of dynamic excitation (see FIGS. 4a, b, c). The advantage of this is that an oscillating force about zero has a time average of zero—hence the object does not move significantly. A disadvantage is that static forces cannot be measured or identified directly in this way.

To solve this problem, in accordance with the present embodiment of the invention, first of all in an operational phase (FIG. 4a), the test-object is subjected to its operational test in which internal and external forces may be present. Then during the calibration phase at least one dynamic oscillating force F11 is applied. The dynamic force is balanced by inertial forces M (FIGS. 4b, 4c). These forces are the result of rigid body motion and deformation eigenmodes of the object.

The responses to the loads, e.g. the indicator signal response of the test-object in the frequency domain are recorded by the sensors (FIG. 5a). The indicator signal per unit load is therefore, in general, a frequency-dependant complex number. In a next step the lower frequency or static response is extracted from the measured responses. The dynamic excitation test covers a certain frequency range between a minimum and maximum frequency. (FIG. 5.) The measured frequency range will result from practical limitations of the actuator and suspension system.

The static part in the response to the loads, e.g. the indicator signal responses needs to be determined. Preferably, as indicated in FIG. 5b, in one embodiment of the present invention the frequency range is below the lowest deformation mode. In that case the measured amplitude approximates the desired static part.

If the measured frequency range is within the range of the modes of the test-object on its supports or other constraints, then these modes are identified and the modal response is subtracted from the total measured load-indicator transfer-functions, which is also indicated in FIG. 5c.

The general equation for the Matrix of the Frequency Response Functions [H] is (Eq. 3):

$$[H] = \sum_i \{\psi_i\} \frac{1}{j\omega - \lambda_i} \{\psi_i\}^T + \{\psi_i\}^* \frac{1}{j\omega - \lambda_i^*} \{\psi_i\}^H \qquad \text{Eq. 3}$$

Where $\{\psi_i\}$ is $i^{th}$ the modal vector, ω is the angular frequency and $\lambda_i$ is the $i^{th}$ pole. The superscript T, * and H are used respectively for the transpose matrix, the complex conjugate and the complex transpose conjugate matrix.

A specific scaling for the modes (unity a) has been assumed. If this is not the case, a scaling factor can be introduced for the modal vector. In general, the modal vector can be built from nodal displacements of the test-object but it can as well contain other signals which can function as indicator signals.

In order to remove the contribution of the first n modes, the following is used:

$$[H] - \left( \sum_i^n \{\psi_i\} \frac{1}{j\omega - \lambda_i} \{\psi_i\}^T + \{\psi_i\}^* \frac{1}{j\omega - \lambda_i^*} \{\psi_i\}^H \right) \qquad \text{Eq. 4}$$

Hence in accordance with embodiments of the present invention, the frequency range where the test-object does not exhibit significant modal behavior is used to extrapolate down in frequency.

If the load-indicator transfer functions of the test-object shows internal modes, then the internal modes and the upper and lower residual modes are identified using modal analysis. The identified modes can then be used in to synthesize the transfer functions from static upwards in frequency. The formulation for the synthesis depends on the character of the load and indicator signal. For a load to displacement (or to strain) transfer function the lower frequency behavior below the lowest mode is asymptotic to a constant, and the higher frequency behavior is asymptotic to the second power of the frequency. In such a case the equation 5 is used.

$$[H_d(\omega)] = \sum \left( \frac{[A_k]}{j\omega - \lambda_k} + \frac{[A_k]^*}{j\omega - \lambda_k^*} \right) + [UR] - \frac{[LR]}{\omega^2} \qquad \text{Eq. 5}$$

In the general, non-reciprocal case the residue matrix can be decomposed in modes shapes and participation factors:

$$[A_k] = \{\psi_k\}\{L_k\}^1 \qquad (6)$$

In the reciprocal case the residue matrix can be decomposed in modes shapes and the complex scale factor:

$$[A_k] = Q_k\{\psi_k\}\{\psi_k\}^1 \quad (7)$$

where:
$[H_d(w)]$: transfer matrix with responses
$[A_k]$: residue matrix of mode k
$\lambda_k$: pole value of mode k
$Q_k$: complex scale factor of mode k
$\{\psi_k\}$: un-scaled mode shape vector of mode k
$\{L_k\}$: participation factor of mode k
[UR]: upper residual term matrix
[LR]: lower residual term matrix $$\lambda_k = \sigma_k + j\omega_k \qquad \text{Eq. 8}$$

$$\lambda_k = \left(-\xi_k + j\sqrt{1-\xi_k^2}\right)\Omega_k \qquad \text{Eq. 9}$$

$$\Omega_k = \sqrt{\omega_k^2 + \sigma_k^2} \qquad \text{Eq. 10}$$

$$\xi_k = -\frac{\sigma_k}{\sqrt{\omega_k^2 + \sigma_k^2}} \qquad \text{Eq. 11}$$

$$\sigma_k = -\xi_k \Omega_k \qquad \text{Eq. 12}$$

where
$\sigma_k$: damping factor
$\omega_k$: damped natural frequency
$\xi_k$: critical damping ratio (quality- or Q-factor:½$\xi_k$)
$\Omega_k$: un-damped natural frequency (rad/s)

Depending on the type of load and on the type of indicator signal the lower frequencies tend to constant, or tend to be proportional to frequency or inverse proportional to frequency or proportional to any discrete power of the frequency. In any case it is possible to integrate or differentiate the three main elements in equation 5 to a formulation which describes the behaviour. In the example below, equation 13, the modes are scaled proportional to frequency. The higher frequencies, as determined by the upper residuals, are also scaled proportional to frequency. The lower frequencies, as mostly determined by the lower residuals, are inverse proportional to frequency.

$$[H_v(\omega)] = j\omega \cdot \sum \left( \frac{[A_k]}{j\omega - \lambda_k} + \frac{[A_k]^*}{j\omega - \lambda_k^*} \right) + j\omega \cdot [UR] - j \cdot \frac{[LR]}{\omega} \qquad \text{Eq. 13}$$

The character of the transfer function between a type of load and a type of indicator is either theoretically known, or it is determined on the basis of measured transfer functions.

The present invention also relates to a load identification system. The system may be made include hardware or may also include software, in the latter case being suitable for operating on a computing device. By way of illustration, the present invention not being limited thereto, an example of a characterization system according to an embodiment of the present invention is shown in FIG. 8, showing standard and optional components. The characterization system 300 comprises an input means 310 adapted for receiving in-situ input data and/or response data regarding the physical system. The latter may comprise an input port 312 for receiving data from a stored position, e.g. from a memory, which may for example be a data port, or an input unit 314 for putting in the data manually by a user. The input means 310 alternatively or in addition thereto may comprise a measurement means 316 for measuring the input data and/or response date regarding the physical system directly or indirectly from the physical system and test-object 100. The input means 310 may also be adapted for receiving system response function data. Such system response function may be representative of the transfer of load to indicator signals between at least one input point and at least one response point. The characterization system furthermore may comprise a processing means 320 adapted for applying signal transformation from time to frequency domain to time domain, and vice-versa, for the load identification from the stored operational signals and transfer functions. The system furthermore may comprise of further a processing means 330 for processing and inversion of the load-indicator relations.

The system optionally also may comprise a processing means 340 for or the above processing means also may be adapted for determining the loads. The processing means 320, 330 and/or 340 may be any suitable processor such as for example a microprocessor, a digital signal processing device, a programmable digital logic device such as a Programmable Array Logic (PAL), a Programmable Logic Array, a Programmable Gate Array or a Field Programmable Gate Array (FPGA), etc. One or more of the different processing steps may for example be based on a predetermined algorithm, based on predetermined rules, based on neural networking, based on a predetermined mathematical method, etc. The characterization system 300 furthermore may be adapted to provide one, some or all functionalities of the method steps as described in embodiments of the above-described aspects of the present invention. The system furthermore may comprise an output means 350 for outputting the obtained transfer path related data. Such an output means 350 may be a visualisation means for visualising the obtained results, or it may be a data port for providing output to an external component. Such information may be adapted to be provided as input data for a simulation system.

FIG. 9 illustrates the flow of operations and data involved in the load identification. The present invention also includes software for carrying out any of the methods of the present invention. The software modules will perform a combination the various operations like:

1. Pre-processing of the operational measurement data. This includes standard signal processing steps to remove, for example, the drift and filter the measurement signals.

2. A transform into the frequency domain, e.g. application of an FFT of the operational measurement data to obtain the corresponding frequency spectra.

3. Integration or differentiation of the measured time signals or of the calculated spectra and frequency response functions.

4. Spatial transformation, and/or averaging, of the measured excitation to indicator transfer functions to other locations of excitation and/or direction of excitation.

5. Optional modal analysis on the load-indicator transfer-function matrix. This results in a set of modes and residual terms.

6. Optional, subtraction of the modes of the test-object on its supports, or other constraints, from the measured transfer functions in the measured frequency band.

7. Synthesis of the load-indicator transfer functions using the identified test-object internal modes from static upwards in frequency, 8. The estimation of the static load to indicator relation from the measured transfer functions potentially corrected when required. This is based on the estimation of the average load to indicator transfer function in the frequency range showing a nearly constant behavior.

9. Completion of the transfer functions downwards in frequency, possibly to DC, on the basis of the estimated static load to indicator relation.

10. The inversion of the measured and modified load to indicator transfer function matrix to a indicator to load transfer function matrix.

11. The transformation of the response to load transfer functions to impulse responses in the time domain.

12. Convolution of the measured response signals in the first time interval with the impulse responses to obtain the force time signals.

13. Multiplication of the measured response spectra with the response to force transfer functions to obtain the force spectra.

14. Inverse FFT of the force spectra to calculate the force time signals.

15. The post-processing of the results. This can include the combination of the estimated forces with transfer, or impulse responses, to determine output time signals, or spectra, and contributions of individual loads to outputs.

FIG. 10 is a schematic representation of a computing system which can be utilized with the methods and in a system according to the present invention. A computer 10 is depicted which may include a video display terminal 14, a data input means such as a keyboard 16, and a graphic user interface indicating means such as a mouse 18. Computer 10 may be implemented as a general purpose computer, e.g. a UNIX workstation or a personal computer. Computer 10 includes a Central Processing Unit ("CPU") 15, such as a conventional microprocessor of which a Pentium processor supplied by Intel Corp. USA is only an example. A number of other units are interconnected via system bus 22. The computer 10 includes at least one memory. Memory may include any of a variety of data storage devices known to the skilled person such as random-access memory ("RAM"), read-only memory ("ROM"), non-volatile read/write memory such as a hard disc as known to the skilled person. For example, computer 10 may further include random-access memory ("RAM") 24, read-only memory ("ROM") 26, as well as an optional display adapter 27 for connecting system bus 22 to an optional video display terminal 14, and an optional input/output (I/O) adapter 29 for connecting peripheral devices (e.g., disk and tape drives 23) to system bus 22. Video display terminal 14 can be the visual output of computer 10, which can be any suitable display device such as a CRT-based video display well-known in the art of computer hardware. However, with a portable or notebook-based computer, video display terminal 14 can be replaced with a LCD-based or a gas plasma-based flat-panel display. Computer 10 further includes user interface adapter 19 for connecting a keyboard 16, mouse 18, optional speaker 36, as well as allowing optional physical value inputs from indicator sensors 40 of an external calibration system 20. In the calibration system the test-object to be tested is subjected to forces by actuators 37. The test-object can be a vehicle such as an automobile, e.g. car or truck, an aircraft, a helicopter, a train, a locomotive, a carriage, a ship, a missile, a rocket, wind turbine, water turbine, steam turbine, etc. The sensors 40 may be any suitable sensors for capturing physical parameters of the test-object under test in system 20. These sensors 40 may include any sensor for capturing relevant physical values that are the results of applied loads to the test-object under test. Additional sensors 41, for capturing physical parameters of a test-object tested in its operating condition 21 may also connected to bus 22 via a communication adapter 39 connecting computer 10 to a data network such as the Internet, an Intranet a Local or Wide Area network (LAN or WAN) or a CAN. These systems allow transmission of physical values over a telecommunications network such as indicator signal measurements and forces and loads as well as a description of the test-object under test.

The term "sensor" includes physical value capture device such devices which provide values of parameters of a physical system such as a test-object to be tested. Similarly, sensors may include devices for transmitting details of time dependent values, e.g. dynamic values. The present invention also includes within its scope that the relevant physical values are input directly into the computer using the keyboard 16 or from storage devices such as 23, e.g. when the results of measurements during the calibration phase or during the operational test phase have been recorded on a suitable signal storage medium, e.g. a machine readable signal storage medium of which a CD-ROM or a DVD-ROM, a USB stick, a solid-state memory are only examples.

The actuators 37 for system 20 may also be connected via a communications adapter 38 for control purposes. The actuators 37 may receive an output value from computer 10 running a computer program for determining a dynamic load value, e.g. amplitude, phase or frequency to be applied to the test-object under test in system 20 and in response to receipt of the output value from computer 10, the actuators 37 apply the relevant load.

Computer 10 can also include a graphical user interface that resides within machine-readable media to direct the operation of computer 10. Any suitable machine-readable media may retain the program for the graphical user interface, such as a random access memory (RAM) 24, a read-only memory (ROM) 26, a magnetic diskette, magnetic tape, or optical disk (the last three being located in disk and tape drives 23). Any suitable operating system and associated graphical user interface (e.g., Microsoft Windows) may direct CPU 15. In addition, computer 10 can include a control program 51 which resides within computer memory storage 52. Control program 51 contains instructions that when executed on CPU 15 carry out the operations described with respect to any of the methods of the present invention.

Those skilled in the art will appreciate that the hardware represented in FIG. 10 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already described.

In the example depicted in FIG. 10, the computer program product (i.e. control program 51) can reside in computer storage 52. However, it is important that while the present invention has been, and will continue to be, that those skilled in the art will appreciate that the mechanisms of the present invention are capable of being distributed as a program product in a variety of forms, and that the present invention applies equally regardless of the particular type of signal bearing media used to actually carry out the distribution. Examples of computer readable signal bearing media include: recordable type media such as floppy disks and CD ROMs and transmission type media such as digital and analogue communication links.

The invention claimed is:

1. A method of determining low frequency or static loads on a system, the system comprising a test-object or structure operating in a first mode of operation, the method comprising:
measuring indicators representing results of first loads exerted on at least one element of the test-object or structure during a first time interval when the system or structure is operating in the first mode of operation, and deriving by measurement a relation between the first loads and the indicators valid for the first mode of operation in a controlled way during a second time interval,
wherein during the second time interval the test-object or structure is operated in a second mode of operation in which the test object or structure is conditioned to allow measurement of responses to applied known, or measureable, second loads, the environment of the test-object or structure and/or the way the test-object or structure is supported, is/are changed compared to the first mode of operation, the relation being determined by applying second loads as dynamic excitations and measuring responses thereto at frequencies which are higher then the frequencies of the first loads applied in the first mode of operation,
extrapolating, or completing down in frequency the relation to cover the frequency range relevant for the first mode of operation, the extrapolation being made either by assuming a frequency independent relation below the measured frequency range or based on a modal model of the test-object or structure, and being applied in an inverse analysis in order to calculate the first loads at other frequencies in the time domain or in the frequency domain.

2. The method of claim 1, wherein part of the frequency range is overlapping in frequency of the first and the second time intervals.

3. The method of claim 1, wherein during, the second time interval, the measurement is done on a partially disassembled test-object or structure, when loads at certain interfaces within the test-object or structure are to be identified, and/or during, the second time interval, the measurement is done on the test-object or structure, or remaining part of, in boundary conditions which provide negligible constraining dynamic forces from the environment, or supports, in the frequency range used in the second time interval, this boundary condition limiting a range of static displacement.

4. The method of claim 1, wherein the dynamic constraining forces from the environment are not negligible, causing additional suspension modes in the frequency range of the second time interval, and wherein a modal model is used to extract the unconstrained behavior from the measured relations between the loads and the indicator signals.

5. The method of claim 1 wherein the extrapolation includes a determination from measurements of a relation matrix between first loads and indicators for the inverse analysis.

6. The method of claim 1, wherein the indicators being results of the loads are strains.

7. The method of claim 1, wherein the test-object or structure to be tested is a vehicle.

8. The method of claim 1 wherein the second loads, as used during the second time interval, are not in the same direction, or same location, as the loads in the first time interval, and geometrical transformation is used to derive the required relations for the identification of the loads in the first time interval.

9. The method of claim 1 wherein the measured relation between the loads and indicators thereto carried out during the second time interval, is synthesized using identified modes and upper and lower residual terms, optionally in combination with integration or differentiation in the frequency domain.

10. A non-transitory machine readable storage medium for storing a computer program product, which when executed by a processor, performs the method of determining low frequency or static loads on a system, the system comprising a test-object or structure operating in a first mode of operation, the method comprising:
measuring indicators representing results of first loads exerted on at least one element of the test-object or structure during a first time interval when the system or structure is operating in the first mode of operation, and deriving by measurement a relation between the first loads and the indicators valid for the first mode of operation in a controlled way during a second time interval,
wherein during the second time interval the test-object or structure is operated in a second mode of operation in which the test object or structure is conditioned to allow measurement of responses to applied known, or measureable, second loads, the environment of the test-object or structure and/or the way the test-object or structure is supported, is/are changed compared to the first mode of operation, the relation being determined by applying second loads as dynamic excitations and measuring responses thereto at frequencies which are higher then the frequencies of the first loads applied in the first mode of operation, extrapolating, or completing down in frequency the relation to cover the frequency range relevant for the first mode of operation, the extrapolation being made either by assuming a frequency independent relation below the measured frequency range or based on a modal model of the test-object or structure, and being applied in an inverse analysis in order to calculate the first loads at other frequencies in the time domain or in the frequency domain.

11. A system for the determination of low frequency or static loads on system, the system including at least a test-object or structure, first loads being exerted on at least one element of the test-object or structure during a first time interval,
the system comprising:
first means for measuring indicators being the results of application of the first loads exerted on at least one element of the test-object or structure during the first time interval of operating in a first mode of operation,
means for exerting second loads in a controlled way on at least one element of the test-object or structure during a second time interval of operating in a second mode of operation,
second means for measuring responses to the application of the second loads,
means for deriving the relation between the first loads and the indicators, the means for deriving using outputs of the second means for measuring,
wherein during the second time interval the test-object or structure is conditioned to allow measurement of the responses, the environment of the test-object and/or the way to support the test-object being changed compared to the first mode of operation to allow measurement of responses to applied known, or measureable, second loads, the second means for measuring being arranged to measure the responses at frequencies which are higher then the frequencies of the loads in the first mode of operation, the means for deriving being arranged to extrapolate the responses, or complete down in frequency, to thereby cover the frequency range of the first mode of operation and to extrapolate either by assuming a frequency independent relation below the measured frequency range or based on a modal model of the test-object or structure, and being arranged to apply an inverse analysis to calculate the first loads in the time domain or in the frequency domain.

12. The system of claim 11, wherein a part of the frequency range is overlapping in frequency of the first and the second time intervals.

13. The system according to claim 11 being a computer based system.

14. The system according to claim 11 wherein the first or second means for measuring comprise strain gauges.

15. The system according to claim 11, wherein the means for deriving is arranged to determine from measurements a relation matrix for the inverse analysis.

16. The system according to claim 11 wherein during the second time interval the test-object or structure is a partially disassembled test-object or structure, when loads at certain interfaces within the test-object or structure are to be identified, and/or during, the second time interval, the measurement is done on the test-object or structure, or remaining part of, in boundary conditions which provide negligible constraining dynamic forces in the frequency range used in the second time interval, but wherein the boundary condition limits the range of static displacement.

17. The system of claim 11, wherein the dynamic constraining forces from the environment are non-negligible, causing additional suspension modes in the frequency range of the second time interval, and wherein the system is arranged to utilize a modal model to extract the unconstrained behavior from the measured relations between the loads and the indicator signals.

18. The system according to claim 11, wherein the test-object to be tested is a vehicle.

19. The system according to claim 11, wherein the excitation forces during the second time interval are not in the same direction, or same location, of the loads in the first time interval, and geometrical transformation is used to derive the required relations for the identification of the loads in the first time interval.

20. The system according to claim 11, wherein the system is arranged so that a measured relation between the loads and indicators thereto carried out during the second time interval, is synthesized using identified modes and upper and lower residual terms.

* * * * *